United States Patent
Weiland

(10) Patent No.: US 9,574,851 B1
(45) Date of Patent: Feb. 21, 2017

(54) GUN ALIGNMENT TECHNIQUE

(71) Applicant: Christopher J. Weiland, King George, VA (US)

(72) Inventor: Christopher J. Weiland, King George, VA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 14/967,003

(22) Filed: Dec. 11, 2015

(51) Int. Cl.
*F41G 3/32* (2006.01)

(52) U.S. Cl.
CPC .................................. *F41G 3/326* (2013.01)

(58) Field of Classification Search
None
See application file for complete search history.

(56) References Cited

U.S. PATENT DOCUMENTS

2014/0283429 A1* 9/2014 Sullivan ............... F41G 11/003
42/111

* cited by examiner

*Primary Examiner* — Kristy A Haupt
(74) *Attorney, Agent, or Firm* — Gerhard W. Thielman, Esq.

(57) ABSTRACT

A method is provided for aligning a gun barrel. The method includes disposing a signal transmitter at the barrel's muzzle, distributing sensors around the barrel to receive the muzzle's signal, calculating the muzzle's coordinate position based on the signal, aiming an electro-optical sensor at a target to determine a miss distance, and calibrating the gun barrel based on the electro-optical sensor based on the miss distance.

5 Claims, 2 Drawing Sheets

GUN ALIGNMENT TECHNIQUE

STATEMENT OF GOVERNMENT INTEREST

The invention described was made in the performance of official duties by one or more employees of the Department of the Navy, and thus, the invention herein may be manufactured, used or licensed by or for the Government of the United States of America for governmental purposes without the payment of any royalties thereon or therefor.

BACKGROUND

The invention relates generally to aligning a gun barrel in relation to a target. In particular, the invention relates to methods for determining and minimizing the miss distance between a gun barrel's line-of-fire and a optional sensor's line-of-sight.

The United States Navy operates combat vessels, some of which are equipped with shipboard artillery, including guns having a five-inch (5") bore for its barrel. The Potomac River Test Range (PRTR) at Dahlgren, Va. is one of the Navy's premiere installations for developing and testing Gun Weapon Systems (GWS). Prior to firing tests of the 5" gun for example, a gun alignment must be performed to match the aimed position with the location at which the projectile ultimately arrives. This necessitates aligning an electro-optic (EO) sensor and the gun pointing angle. If the EO/gun combination is not aligned, the gunner does not have an accurate gun pointing angle, constituting a prohibitively unsafe condition.

A typical gun alignment requires eight man-days (four people working two days of eight-hour shifts). A high accuracy Global Positioning System (GPS) receiver is disposed in the barrel of a test gun to establish the gun's position in relation to a world coordinate system for reference. Next, a target boat with a similar GPS receiver is dispatched onto the PRTR to establish the target's position in relation to the reference coordinates. The gunner for the test gun aims the barrel at the target boat using an EO sensor to point the barrel at the target boat. Measurements of where the gun actually points to versus where the gun expects to be aiming at are conducted. After several iterations, calculations of the errors in barrel/EO misalignment are performed. The resulting errors are applied to a calibration to minimize the barrel/EO misalignment.

SUMMARY

Conventional gun alignment methods yield disadvantages addressed by various exemplary embodiments of the present invention. In particular, a method is provided for aligning a gun barrel towards a target. The method includes disposing a signal transmitter at the barrel's muzzle, distributing sensors around the barrel to receive the muzzle's signal, calculating the muzzle's coordinate position based on the signal, aiming an electro-optical sensor at a target to determine a miss distance, and calibrating the gun barrel based on the electro-optical sensor based on the miss distance.

BRIEF DESCRIPTION OF THE DRAWINGS

These and various other features and aspects of various exemplary embodiments will be readily understood with reference to the following detailed description taken in conjunction with the accompanying drawings, in which like or similar numbers are used throughout, and in which.

DETAILED DESCRIPTION

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

In accordance with a presently preferred embodiment of the present invention, the components, process steps, and/or data structures may be implemented using various types of operating systems, computing platforms, computer programs, and/or general purpose machines. In addition, those of ordinary skill in the art will readily recognize that devices of a less general purpose nature, such as hardwired devices, or the like, may also be used without departing from the scope and spirit of the inventive concepts disclosed herewith. General purpose machines include devices that execute instruction code. A hardwired device may constitute an application specific integrated circuit (ASIC) or a field programmable gate array (FPGA) or other related component.

Figure 1:
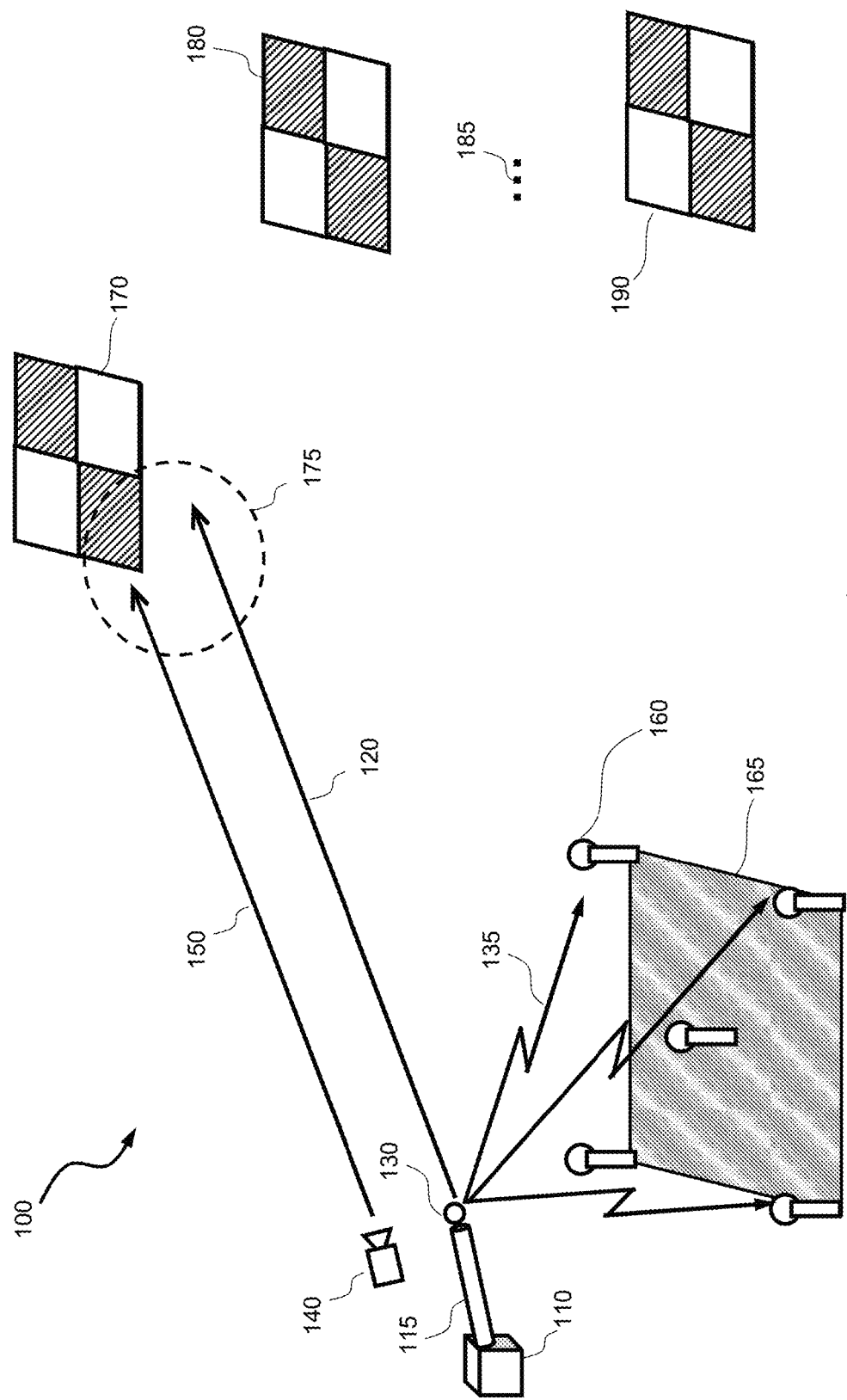
FIG. 1 is a perspective schematic view of a gun alignment system.

FIG. 1 shows a perspective schematic view 100 of a gun alignment system. A test gun 110 having a barrel 115 through which projectiles can be launched along a line-of-fire 120. At the muzzle end, the barrel 115 includes a transmitter 130 to emit radio signals 135. An EO sensor 140 operates along a line-of-sight 150 towards a prospective target. Remote ground-based sensors 160 are disposed in a grid 165 remote from the gun 110 in proximity to the transmitter 130 to receive signals 135 therefrom, as well as from GPS satellites for reference coordinates. The ground sensors 160 are arranged to have discrete positions in relation to the gun 110. A plurality of N targets can be presented, starting with the first target 170. The difference between the line-of-sight 150 and the line-of-fire 120 is confined to a region 175 in the vicinity of the first target 170. Additional targets include the second target 180 through intermediate targets 185 up to the $N^{th}$ target 190. The targets 170, 180 and 190 can include visual patterns to facilitate visual detection.

Based on the GPS transceiver 130, the barrel 115 has Cartesian coordinates of the barrel location $(X_b, Y_b, Z_b)$. Similarly, the EO sensor 140 has Cartesian coordinates of each sensor location $(X_e, Y_e, Z_e)$, and the first target has Cartesian coordinates of the target location $(X_t, Y_t, Z_t)$. A "miss" distance between the EO sensor's line-of-sight 150 and the barrel's line-of-fire 120 can be determined in relation to the first target 170. After aiming at all N targets, the system level accuracy can be quantitatively computed and adjustments applied to account for for parallax between the barrel 115 and the EO sensor 140.

Figure 2:
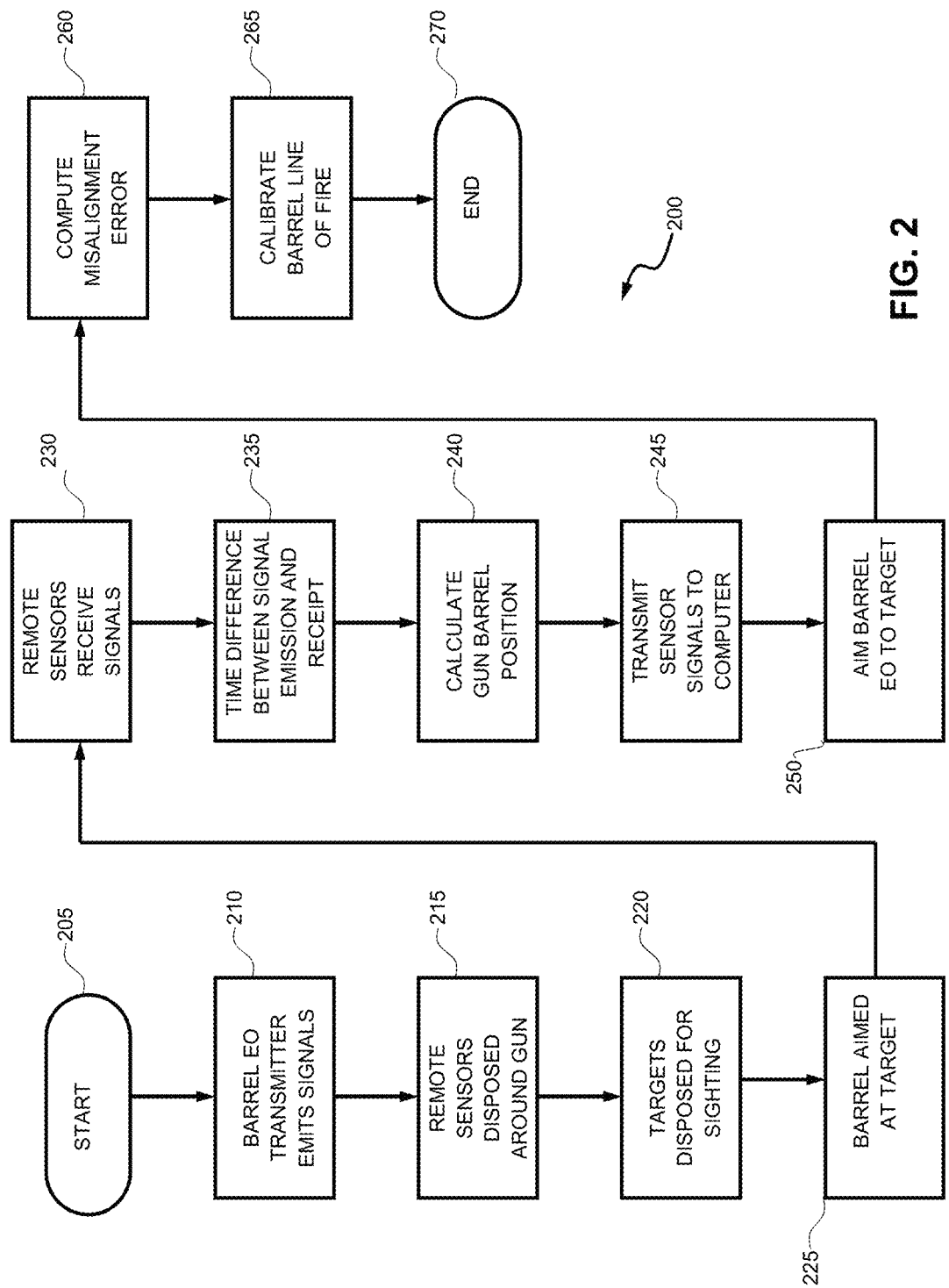
FIG. 2 is a flowchart view of a procedural method for gun alignment.

Various exemplary embodiments provide a rapid method for aligning large-caliber guns on the PRTR. This is necessary to reduce the cost and time to conduct many gun tests while maintaining high accuracy. This process can be described as in FIG. 2 as a flowchart diagram view 200. The process begins as initiation 205.

As a first step 210, the transmitter 130 is disposed in the gun barrel 115 and emits an established electromagnetic or acoustic signal 135 at known intervals. As a second step 215, the ground sensors 160 capable of receiving the emitter signal 135 from the transmitter 130 are disposed at precisely known positions in the grid 165 around the gun 110. As a third step 220, the first target 170 with a geometric pattern is disposed at a distance (i.e., several hundred meters to thousands of meters) away from the gun 110.

As a fourth step 225, the gunner points the barrel 115 at one of the known target positions by a line-of-fire 120. As a fifth step 230, the emitter signal 135 is received by the ground sensors 160. As a sixth step 235, the difference in time between when the signal 135 was emitted and received, for every ground sensor 160, is used to calculate the orientation of the barrel 115. This is known as trilateration; the opposite of this method is used by GPS satellites.

As a seventh step 240, the position of the barrel 115 may be known very accurately by employing least-squares or other optimization techniques. As an eighth step 245, the barrel position may be converted to a gun pointing angle. As a ninth step 250, the emitter/sensor signals 135 are sent to a common data acquisition system and then to a computer. The time delay is measured via the data acquisition system, and the computer converts this time delay information into spatial information information via processing algorithms. As a tenth step 255, the EO sensor 140, aimed at the known first target 170, sends its video feed to the same computer. This is used to compute the EO pointing vector from established EO sight and target positions. The EO sensor 140 pointing angle is known very precisely by utilizing sub-sub-pixel accuracy computer vision schemes. Thus as an eleventh step 260, the gun gun pointing angle from line-of-fire 120 and pointing angles of the EO sensor 140 from line-of-sight 150 may be compared and the misalignment error computed. As a twelfth step 265, the misalignment errors are then applied to a calibration for providing guidance correction to the aim direction of the barrel 115. The operation operation then terminates 270.

The system can be used anytime precise comparisons of pointing angles between mechanical and visual (i.e., video) systems are desired. The use of the exemplary system to only PRTR is not implied; many ranges could use such a system. For installation on a sea-going vessel, the principles of operation would enable sea borne GWS to perform precise barrel/EO misalignment calculations and calibrations. For example, a sea borne GWS could utilize an Unmanned Aerial Vehicle (UAV) with Differential GPS (DGPS) to provide a precise known target position for EO/Barrel calibrations in a similar manner as described above. The exemplary system can save money and increase productivity while delivering a superior measurement.

Exemplary sub-pixel accuracy schemes have not been used for precise EO pointing calculations, but provide much more accurate measurements. The utility of a system of receivers 160 for computing barrel pointing angle has not been previously accomplished, but can be designed to give more accurate measurements. Large Navy guns (57 mm, 5" diameter, etc.) are integrated into a weapon system, which among other things has both the gun 110 and an electro-optical (EO) sensor 140. The EO sensor 140 is provided so that a gunner operator can remotely determine the aim point of the gun barrel 115. Every time the gun 110 is fired, the gun 110 and EO sensor 140 have the potential for misalignment. Conventional methods for aligning the gun 110/EO 140 are time consuming (about two days with four or five people working). The proposed concept enables a rapid, simple method for aligning the gun/EO to a high degree of accuracy.

A transmitter 130 (sound, radio, light, or other electromagnetic spectrum) is placed on the bore end of the barrel 115. Several (at least five) ground sensors 160 capable of receiving the transmitter signal 135 are placed in accurately surveyed locations, forming a grid 165 around the end of the muzzle 115. The distance from the barrel transmitter 130 to each ground sensor 160 changes with the orientation of the barrel 115 (i.e., aim point of barrel). The propagation speed of the transmitter emissions is constant. Thus, the time required the transmitter signal 135 to reach each sensor 160 enables the precise calculation of the barrel pointing angle. Trilateration algorithms are well established in the art.

At accurately surveyed locations on the grid 165, a large "target" is placed. These targets have a particular pattern displayed that enable sub-pixel accuracy registration algorithms to be applied. From this, the EO sensor 140 knows its pointing angle. When the gun/EO aim at a known target location, the exact pointing angle of the EO sensor 140 is known from the known target position. The gun pointing angle is known from the ground sensors 160. Thus, the degree of misalignment can be accurately calculated very rapidly using mathematics. When N targets are imaged, a statistical assessment of the gun/EO misalignment errors can be computed.

While certain features of the embodiments of the invention have been illustrated as described herein, many modifications, substitutions, changes and equivalents will now occur to those skilled in the art. It is, therefore, to be understood that the appended claims are intended to cover all such modifications and changes as fall within the true spirit of the embodiments.

What is claimed is:

1. An alignment method for directing a gun barrel along a line-of-fire, said method comprising:
   disposing a signal transmitter on a muzzle of the gun barrel to emit a barrel signal;
   disposing a plurality of remote sensors at discrete distances from the gun barrel to receive said barrel signal;
   determining a coordinate position for said muzzle from said barrel signal;
   positioning an electro-optical sensor towards a target along a line-of-sight;
   calculating a miss distance between said line-of-sight and the line-of-fire; and
   calibrating the line-of-fire.

2. The method according to claim 1, wherein said miss distance is calculated by an algebraic relation.

3. The method according to claim 1, wherein said remote sensors are arranged in a grid pattern.

4. The method according to claim 1, wherein said target constitutes a consecutive plurality of targets.

5. The method according to claim 1, wherein said coordinate position is determined by a least-squares technique.

* * * * *